United States Patent
Keller et al.

(10) Patent No.: US 11,006,309 B2
(45) Date of Patent: May 11, 2021

(54) NETWORK NODE, RADIO NETWORK NODE AND METHODS PERFORMED THEREIN

(71) Applicant: Telefonaktiebolaget LM Ericsson (publ), Stockholm (SE)

(72) Inventors: Ralf Keller, Würselen (DE); Mats Stille, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/777,652

(22) PCT Filed: Nov. 18, 2015

(86) PCT No.: PCT/SE2015/051241
§ 371 (c)(1),
(2) Date: May 18, 2018

(87) PCT Pub. No.: WO2017/086846
PCT Pub. Date: May 26, 2017

(65) Prior Publication Data
US 2018/0376364 A1 Dec. 27, 2018

(51) Int. Cl.
*H04W 4/50* (2018.01)
*H04W 28/02* (2009.01)
(Continued)

(52) U.S. Cl.
CPC ......... *H04W 28/0215* (2013.01); *H04W 4/50* (2018.02); *H04W 28/0252* (2013.01);
(Continued)

(58) Field of Classification Search
CPC . H04L 5/003–0035; H04L 5/0078–008; H04L 5/0091–0098; H04W 4/30;
(Continued)

(56) References Cited

U.S. PATENT DOCUMENTS

| 2011/0276447 A1 | 11/2011 | Paul et al. | |
|---|---|---|---|
| 2013/0176975 A1* | 7/2013 | Turanyi | H04W 72/087 370/329 |

(Continued)

OTHER PUBLICATIONS

International Search Report and Written Opinion for International Application No. PCT/SE2015/051241, dated Jul. 13, 2016, 13 pages.
(Continued)

*Primary Examiner* — Timothy J Weidner
(74) *Attorney, Agent, or Firm* — Patent Portfolio Builders, PLLC

(57) ABSTRACT

A method performed by a network node for enabling communication with a wireless device via a radio network node in a communication network, which network node supports a first set of functionalities out of a total set of functionalities in a core network of the communication network. The first set of functionalities belongs to a first network slice of the core network, and is separated from another set of functionalities out of the total set of functionalities in the core network. The network node initiates a transmission of an indication, during a connection setup for the wireless device, to the radio network node, which indication indicates the supported first set of functionalities.

16 Claims, 12 Drawing Sheets

(51) Int. Cl.
| | |
|---|---|
| *H04W 48/00* | (2009.01) |
| *H04W 48/18* | (2009.01) |
| *H04W 72/04* | (2009.01) |
| *H04W 72/08* | (2009.01) |
| *H04W 72/10* | (2009.01) |
| *H04W 72/12* | (2009.01) |
| *H04W 76/11* | (2018.01) |
| *H04W 88/10* | (2009.01) |
| *H04W 88/12* | (2009.01) |
| *H04W 92/12* | (2009.01) |

(52) U.S. Cl.
CPC ....... *H04W 28/0268* (2013.01); *H04W 48/17* (2013.01); *H04W 48/18* (2013.01); *H04W 72/048* (2013.01); *H04W 72/0493* (2013.01); *H04W 72/08* (2013.01); *H04W 72/10* (2013.01); *H04W 72/1205* (2013.01); *H04W 72/1247* (2013.01); *H04W 76/11* (2018.02); *H04W 88/10* (2013.01); *H04W 88/12* (2013.01); *H04W 92/12* (2013.01)

(58) Field of Classification Search
CPC ..... H04W 4/38; H04W 4/44; H04W 4/50–70; H04W 16/02–16; H04W 28/02; H04W 28/0215; H04W 28/0247–0268; H04W 28/08–085; H04W 28/16–26; H04W 36/16; H04W 36/22; H04W 36/24; H04W 36/26; H04W 36/34; H04W 36/38; H04W 36/385; H04W 48/17; H04W 48/18; H04W 68/12; H04W 72/04; H04W 72/0433; H04W 72/048; H04W 72/0493; H04W 72/06; H04W 72/08; H04W 72/087; H04W 72/10; H04W 72/1205; H04W 72/1242; H04W 72/1247; H04W 72/1257; H04W 76/10–19; H04W 88/10; H04W 88/12; H04W 92/04; H04W 92/045; H04W 92/12
See application file for complete search history.

(56) References Cited

U.S. PATENT DOCUMENTS

| | | | |
|---|---|---|---|
| 2013/0303114 A1* | 11/2013 | Ahmad | H04W 16/14 455/406 |
| 2015/0263891 A1 | 9/2015 | Baugher et al. | |
| 2016/0353465 A1* | 12/2016 | Vrzic | H04W 28/0247 455/452.1 |
| 2018/0206152 A1* | 7/2018 | Zhang | H04W 28/24 370/329 |
| 2018/0262979 A1* | 9/2018 | Wang | H04W 48/18 370/328 |
| 2018/0368140 A1* | 12/2018 | Centonza | H04W 72/0426 370/329 |
| 2019/0021047 A1* | 1/2019 | Zong | H04W 76/11 370/329 |
| 2019/0045351 A1* | 2/2019 | Zee | H04W 76/11 370/329 |
| 2019/0141760 A1* | 5/2019 | Stille | H04W 76/12 370/329 |

OTHER PUBLICATIONS

3GPP TR 23.707, "3rd Generation Partnership Project; Technical Specification Group Services and System Aspects; Architecture Enhancements for Dedicated Core Networks; Stage 2 (Release 13)," Dec. 2014, 39 pages, V13.0.0, 3GPP Organizational Partners.

3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 13)," Jun. 2015, 324 pages, V13.3.0, 3GPP Organizational Partners.

3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 13)," Sep. 2015, 334 pages, V13.4.0, 3GPP Organizational Partners.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Sep. 2015, 254 pages, V13.1.0, 3GPP Organizational Partners.

* cited by examiner

NETWORK NODE, RADIO NETWORK NODE AND METHODS PERFORMED THEREIN

CROSS-REFERENCE TO RELATED APPLICATIONS

This application is a National stage of International Application No. PCT/SE2015/051241, filed Nov. 18, 2015, which is hereby incorporated by reference.

TECHNICAL FIELD

Embodiments herein relate to network node, radio network node and methods performed therein for wireless communication. Furthermore, a computer program and a computer readable storage medium are also provided herein. In particular, embodiments herein relate to enabling communication between the network node and a wireless device via the radio network node in a communication network.

BACKGROUND

In a typical communication network, wireless devices, also known as wireless communication devices, mobile stations, stations (STA) and/or user equipments (UE), communicate via a Radio Access Network (RAN) to one or more core networks. The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". The area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs are typically connected to one or more core networks.

Specifications for the Evolved Packet System (EPS), also called as Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as a radio access network of an LTE network, and the Evolved Packet Core (EPC), also known as System Architecture Evolution (SAE) core network. E-UTRAN/LTE is a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain and comprises the EPC and E-UTRAN. FIG. 1 is an overview of the EPC architecture. This architecture is defined in 3GPP TS 23.401 v.13.4.0 wherein a definition of a Packet Data Network Gateway (PGW), a Serving Gateway (SGW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The S1-MME interface is used for control plane between eNodeB/E-UTRAN and MME. The main protocols used in this interface are S1 Application Protocol (S1-AP) and Stream Control Transmission Protocol (SCTP). S1AP is the application Layer Protocol between the radio network node and the MME and SCTP for example guarantees delivery of signaling messages between MME and the radio network node. The transport network layer is based on Internet Protocol (IP).

A subset of the S1 interface provided functions are:
S1-interface management functions such as S1 setup, error indication, reset and the radio network node and MME configuration update.
UE Context Management functionality such as Initial Context Setup Function and UE Context Modification Function.
E-UTRAN Radio Access Bearer (E-RAB) Service Management function e.g. Setup, Modify, Release.
Mobility Functions for wireless devices in EPS Connection Management (ECM)-CONNECTED, e.g. Intra-LTE Handover and inter-3GPP-Radio Access Technology (RAT) Handover.
S1 Paging function.
Non Access Stratum (NAS) Signaling Transport function.
Establishment of the S1-MME interface on S1AP protocol level is shown in FIG. 3 as the S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An Initial Context Setup process is shown in FIG. 4. An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. Current assumption is that the RAN-CN split is similar for 5G as for 4G, implying an (evolved) S1 interface. An INITIAL CONTEXT SETUP RESPONSE message is sent by eNB to the MME confirming the setup.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of that mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/user and control plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGW) or Virtualized PDN-GW (vPDN-GW).

NFV is seen as an enabler for network slicing that is described herein.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

Slicing can also be used to isolate different services in an operator's network. Future networks are expected to support new use cases going beyond the basic support for voice services and mobile broadband currently supported by existing cellular network, e.g. 2G/3G/4G. Some example use cases include:
Evolution of MBB
   Evolved communication services
   Cloud services
   Extended mobility and coverage
Mission critical Machine Type Communication
   Intelligent traffic systems
   Smart grid
   Industrial applications
Massive Machine Type Communication
   Sensors/actuators
   Capillary networks
Media
   Efficient on-demand media delivery
   Media awareness
   Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future network should address the needs of
Enterprise services
Government services, e.g. national safety
Verticals industries, e.g. automation, transportation
Residential users These different users and services are also expected to put new requirements on the network. Network slicing introduces the possibility that the network slices are used for different services and use cases. FIG. 5 shows an example of the network slicing for a case when there exists different network slices in the core network for MBB, Massive MTC and Critical MTC.

A new standard denoted 3GPP DÉCOR is developing solutions where wireless devices with different performance and robustness requirements like machine type and mobile broadband can be isolated from one another over the different network slices. Thereby misbehaving wireless devices in one network slice should not negatively impact performance of other network slices. The concept of network slices is at the moment limited to separating resources or functionalities in packet core, but may also be extended to servers with connectivity to packet core within the same Public Land Mobile Network (PLMN).

Network slicing introduces the possibility that the network slices are used for different services and use cases and there is a need to use these services for wireless devices in the wireless communication network. This is illustrated in FIG. 6, where a tablet using Voice over LTE (VoLTE) is served by a network slice#1 and the vehicle being a MTC device is served by a second network slice, network slice#2.

The same or similar communication services may be used via different network slice types. In FIG. 7 this is exemplified using IP Multimedia Subsystem (IMS), but the problem is not limited to IMS. In FIG. 7 the tablet is using an MMTel service via IMS through the network slice#1 and the MTC device is using an MMTel service via IMS through the second network slice, network slice#2. Hence, same Quality of Service Class Identifier (QCI) bearers may be used via different network slices illustrated as QCI=x.

In today's RAN scheduling, all traffic that is sent via e.g. a particular QCI bearer may be scheduled in a same way for all subscribers leading to a non flexible system with a limited performance of the communication network.

SUMMARY

An object of embodiments herein is to provide a mechanism for improving performance of the communication network in an efficient manner.

According to an aspect the object is achieved by a method performed by a network node for enabling communication between the network node and a wireless device via a radio network node in a communication network. The network node supports a first set of functionalities out of a total set of functionalities in a core network of the communication network, which first set of functionalities belongs to a first network slice of the core network, and is separated from another set of functionalities out of the total set of functionalities in the core network. The network node initiates a transmission of an indication, during a connection setup for the wireless device, to the radio network node, which indication indicates the supported first set of functionalities.

According to another aspect the object is achieved by a method performed by a radio network node for enabling communication between a wireless device and a network node comprised in a communication network. The radio network node receives from the network node, during a connection setup for the wireless device, a transmission of an indication. The indication indicates a first set of functionalities supported, at the network node, out of a total set of functionalities in a core network of the communication network, which first set of functionalities belongs to a first network slice of the core network, and is separated from another set of functionalities out of the total set of functionalities in the core network. The radio network node then schedules one or more resources for communicating with the wireless device taking into account the indication.

According to yet another aspect the object is achieved by providing a network node for enabling communication between the network node and a wireless device via a radio network node in a communication network. The network node is configured to support a first set of functionalities out of a total set of functionalities in a core network of the communication network. The first set of functionalities belongs to a first network slice of the core network, and is separated from another set of functionalities out of the total set of functionalities in the core network. The network node is configured to initiate a transmission of an indication, during a connection setup for the wireless device, to the radio network node. The indication indicates the supported first set of functionalities.

According to still another aspect the object is achieved by providing a radio network node for enabling communication between a wireless device and a network node comprised in a communication network. The radio network node is configured to receive, from the network node during a connection setup for the wireless device, a transmission of an indication, which indication indicates a first set of functionalities supported, at the network node, out of a total set of functionalities in a core network of the communication network, which first set of functionalities belongs to a first network slice of the core network, and is separated from another set of functionalities out of the total set of functionalities in the core network. The radio network node is further configured to schedule one or more resources for communicating with the wireless device (10) taking into account the indication.

It is furthermore provided herein a computer program comprising instructions, which, when executed on at least one processor, cause the at least one processor to carry out any of the methods above, as performed by the network node or the radio network node. It is additionally provided herein a computer-readable storage medium, having stored thereon a computer program comprising instructions which, when executed on at least one processor, cause the at least one processor to carry out the method according to any of the methods above, as performed by the network node or the radio network node.

Hence, the network in the shape of the network node informs the RAN, i.e. the radio network node, about which set of functionalities is used by a particular wireless device, e.g. using a network slice ID as the indication. This will enable the radio network node to schedule one or more resources for the wireless device depending on the set of functionalities supported, i.e. type of network slice, providing a flexible communication network with improved performance in an efficient manner. Traffic that is sent via e.g. a particular QCI bearer may be scheduled in a different manner than traffic over a bearer with the same QCI but from a different network slice.

BRIEF DESCRIPTION OF THE DRAWINGS

Embodiments will now be described in more detail in relation to the enclosed drawings, in which.

DETAILED DESCRIPTION

Figure 1:
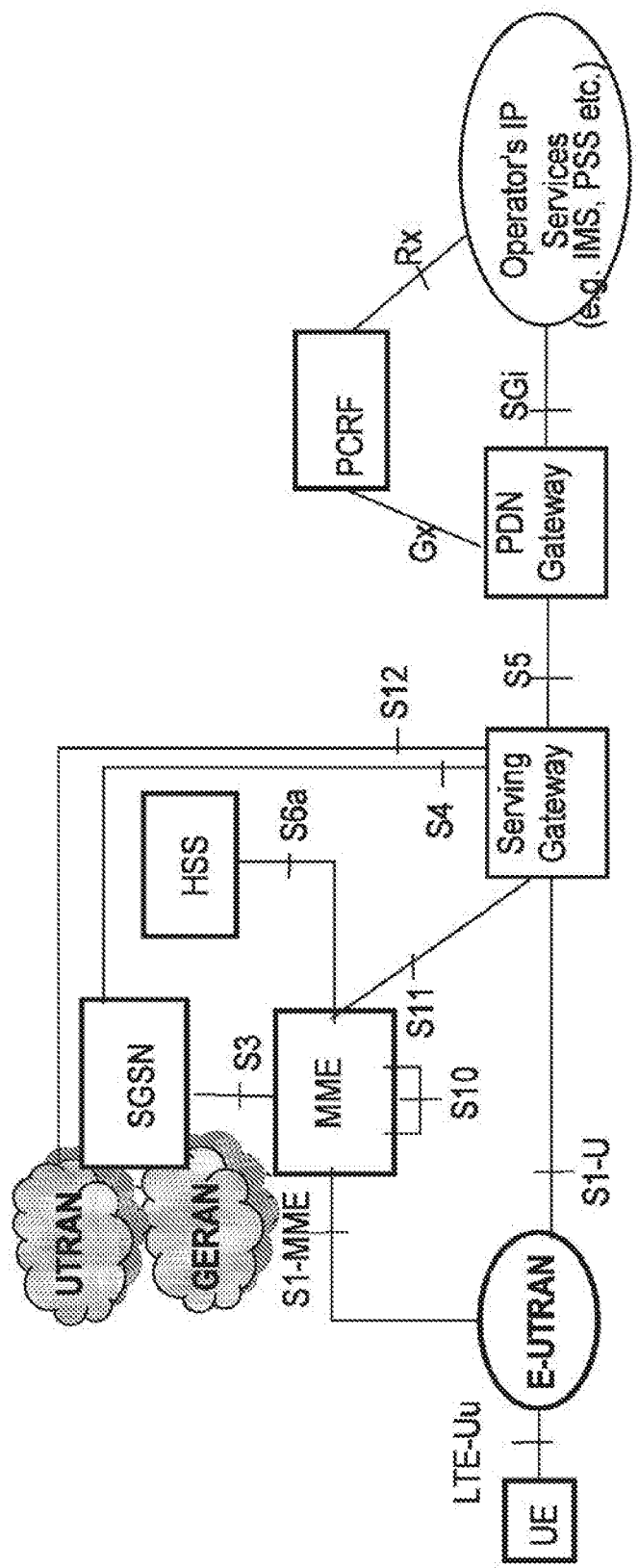
FIG. 1 is a schematic overview depicting a communication network according to prior art.
Figure 2:
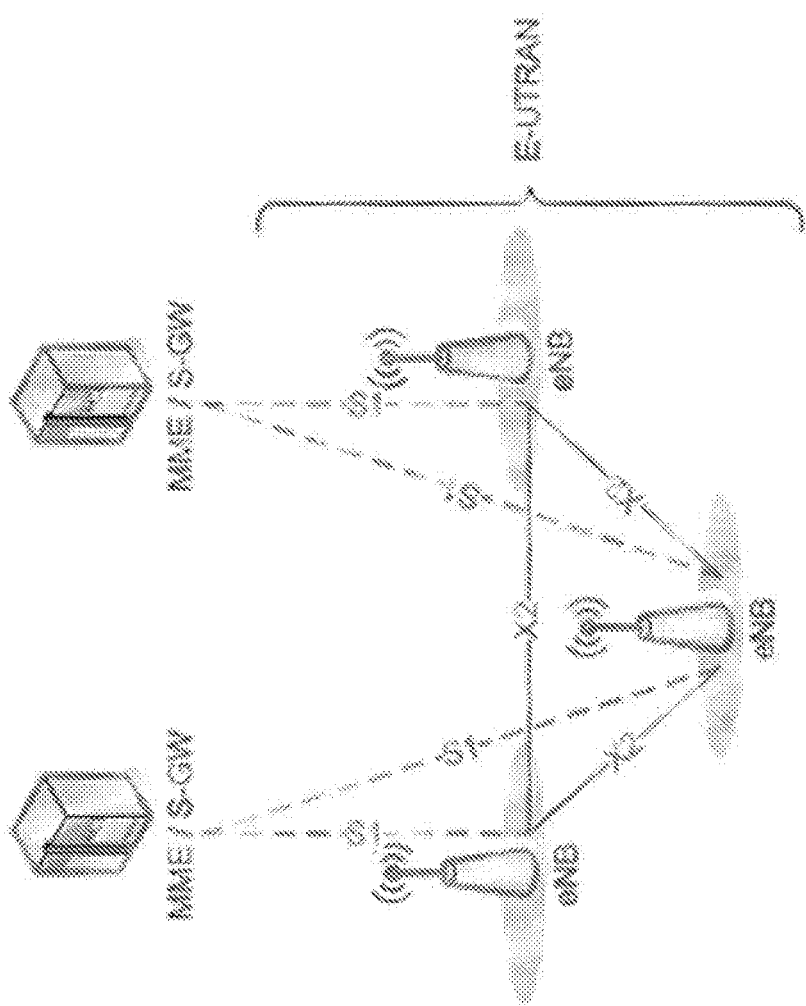
FIG. 2 is a schematic overview depicting a radio access network in connection with a core network.
Figure 3:
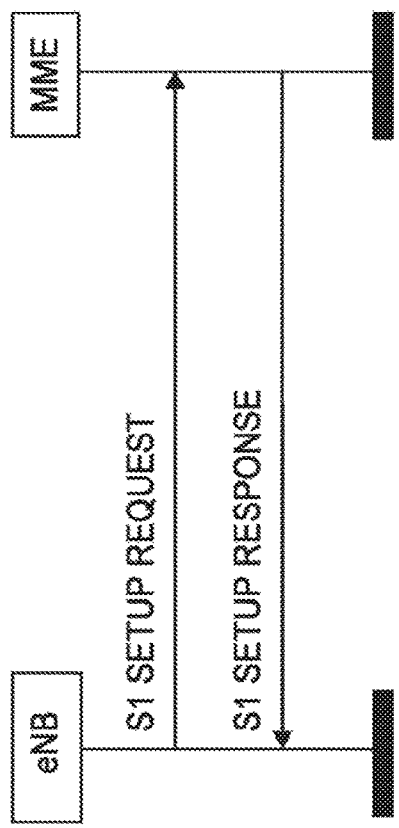
FIG. 3 is a signalling scheme according to prior art.
Figure 4:
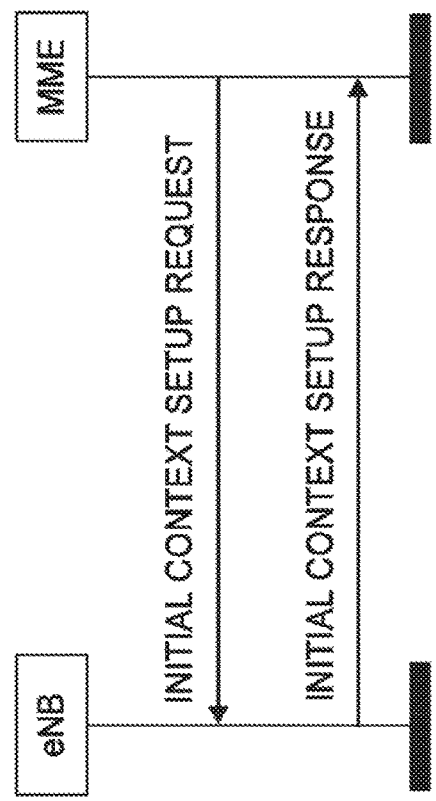
FIG. 4 is a signalling scheme according to prior art.
Figure 5:
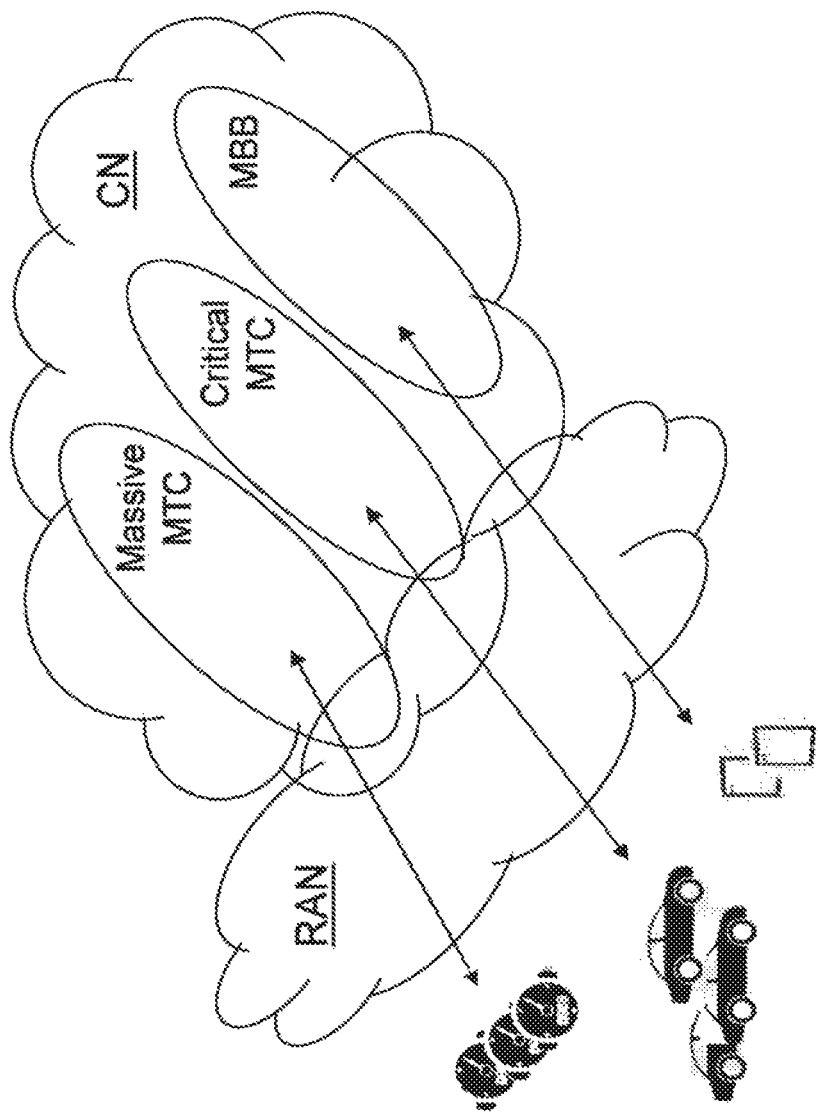
FIG. 5 is a schematic overview depicting an example of a slicing of a core network according to prior art.
Figure 6:
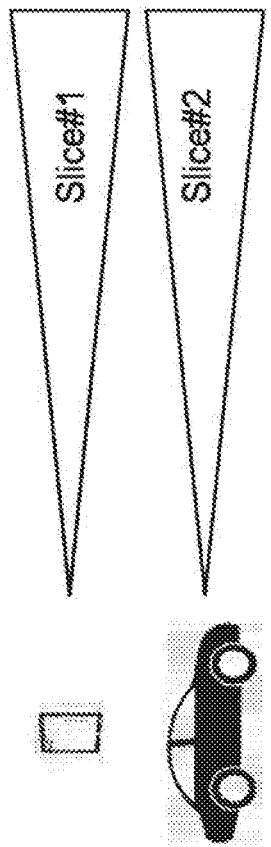
FIG. 6 is a schematic overview depicting an example of a using slicing according to prior art.
Figure 7:
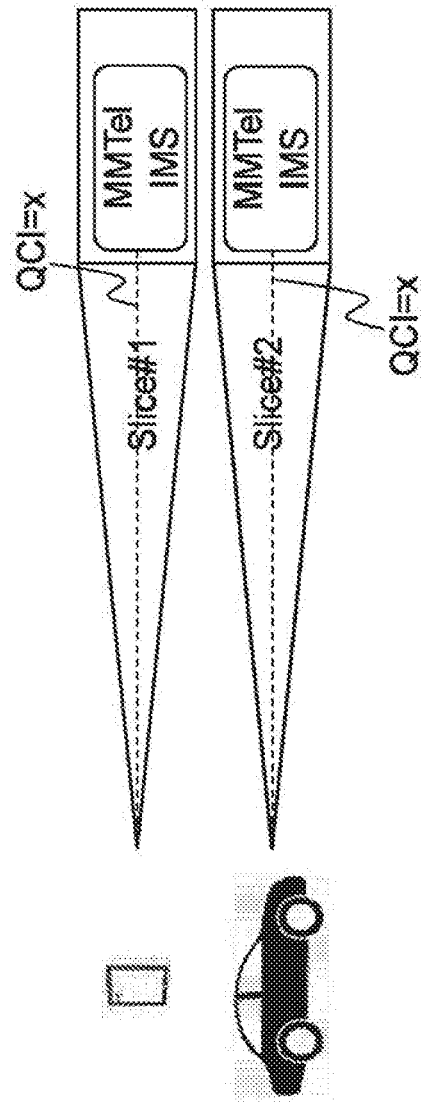
FIG. 7 is a schematic overview depicting an example of a using slicing according to prior art.
Figure 8:
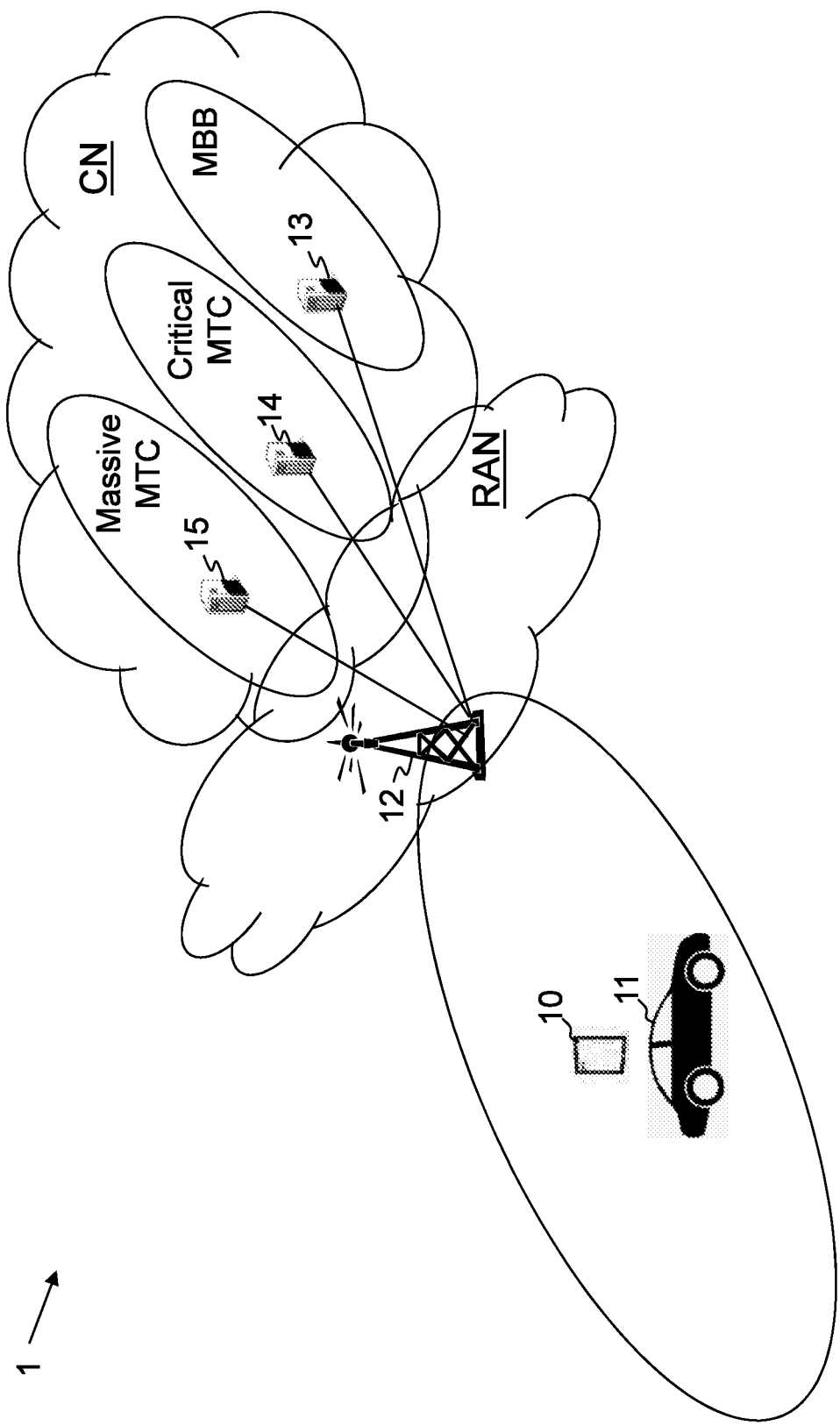
FIG. 8 is a schematic overview depicting a communication network 1 according to embodiments herein.

Embodiments herein relate to communication networks in general. FIG. 8 is a schematic overview depicting a communication network 1. The communication network 1 comprises one or more RANs and one or more CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. WCDMA and LTE.

In the communication network 1, wireless devices e.g. a wireless device 10 such as a mobile station, a non-access point (non-AP) STA, a STA, a user equipment and/or a wireless terminals, communicate via one or more Access Networks (AN), e.g. RAN, to one or more core networks (CN). It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises a radio network node 12 providing radio coverage over a geographical area, a first service area, of a first radio access technology (RAT), such as LTE, Wi-Fi or similar. The radio network node 12 may be a radio access network node such as radio network controller or an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the radio network node 12 depending e.g. on the first radio access technology and terminology used.

Furthermore, the communication network 1 comprises a core network (CN) virtually network sliced into a number of network slices, each network slice or core network slice supports a type of wireless devices and/or a type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes providing the services/functionalities for the respective network slice. A first network slice for massive MTC devices may comprise a first network node 13. A second network slice for critical MTC devices may comprise a second network node 14. A third network slice for MBB devices may comprise a third network node 15. Each network slice supports a set of functionalities out of a total set of functionalities in the communication network. E.g. the first network node 13 supports a first set of functionalities out of the total set of functionalities in the communication network 1. The first set of functionalities is separated from a different set of functionalities out of the total set of functionalities in the communication network 1. E.g. the first set of functionalities, being e.g. associated with Massive MTC devices, is separated or logical separated, e.g. using separated data storage or processing resources, from a second set of functionalities of the second network slice. The first set of functionalities may be associated with a certain type of wireless devices, a certain enterprise, a certain operator or a certain agreement. The network node illustrated herein is exemplified as the first network node 13 but does also cover the second and third network nodes.

The first set of functionalities may use one or more resources in a core network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the network node may be separated from other network nodes supporting a second set of functionalities out of the total set of functionalities in the communication network. Separated meaning herein that the network nodes may be executed on a same hardware platform but using different resources of the hardware. Hence, the first network node 13 supports the first set of functionalities out of the total set of functionalities in the core network of the communication network, which first set of functionalities belongs to the first network slice of the core network, and is separated from another set of functionalities out of the total set of functionalities in the core network.

As part of developing the embodiments herein a problem has been identified as scheduling QCI bearers in a same way irrespective of the network slice may negatively impact user experience and resource utilization if these bearer have special demands on the scheduling like QCI=5 that is used for signaling and QCI=½ that are used for Guaranteed Bit Rate (GBR) traffic. Please note that each Operators or PLMN may define one QCI bearer with particular characteristic to be used in all network slices. Operators may also define QCI classes that are only valid in a particular network slice and that are scheduled differently, but that may have impact on wireless devices and it increases the configuration effort. Embodiments herein provide a mechanism wherein the first network node 13 initiates, during a connection setup for the wireless device 10, a transmission of an indication to the radio network node 12, which indication indicates the supported first set of functionalities, e.g. a slice-ID. Thereby the first network node 13 informs the radio network node 12 about which slice type is used by the wireless device 10. Each network node, e.g. the first, the second and the third network node, may transmit an own indication indicating their own set of functionalities e.g. respective slice-ID.

Embodiments herein enable scheduling traffic on different network slices differently even if using e.g. a same QCI bearer in each network slice. It even allows differentiating between wireless devices using the same network slice. This is beneficial if e.g., one network slice type is used by e.g. 10 Million devices while the other network slices type is used by 1000 Million devices, but the same bearers are used via both network slice types. It also allows treating devices from operators within an operator group differently than devices from outside of that operator group.

The communication service experience via one network slice type must not be negatively impacted by traffic via other network slice type(s). Embodiments herein enable to differently schedule resources for QCI bearers but also for NAS signalling once the slice type has been identified.

Figure 9:
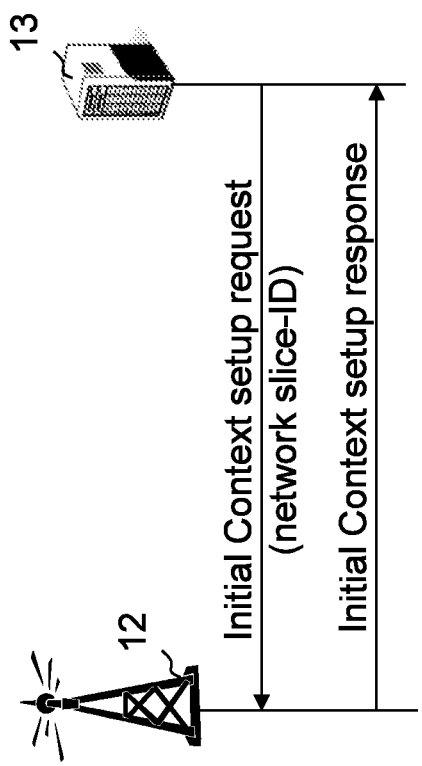
FIG. 9 is a signalling scheme according to some embodiments herein.

FIG. 9 shows one example of the wireless device level indication as part of the Initial Context Setup procedure. The first network node 13 may transmit an Initial Context Setup Request with the indication indicating the supported first set of functionalities, such as the network slice-ID. The radio network node 12 responds with an Initial Context Setup Response. Once the radio network node 12 receives the network slice-ID, it is stored in an internal or external data structure and associated with a UE context related to the wireless device 10 for which the Initial Context Setup is triggered. The indication for the UE-context is used when scheduling resources e.g. selecting QCI bearer based on the set of functionalities supported by the respective network node.

A first example of such functionality in the first set of functionalities is active mode mobility support. The first network slice may support or the first set of functionalities may comprise:

Both S1- and X2-based handovers, which is the normal current level of support;

Only X2-based handover. This would have the benefit that the first network slice would not need to support any S1-based handover related functionality such as the relevant signaling on S1-interface and a handover routing function needed for S1-based handovers.

Only S1-based handover. This would have the benefit that the first network slice would not need to support any X2-based handover related functionality such as the relevant signaling on S1-interface.

No mobility support at all. This would have the benefit that the first network slice would not need to support any X2- or S1-based handover related functionality such as the relevant signaling on S1-interface and a handover routing function needed for S1-based handovers.

This is a non-exhaustive list of functionalities. There might be parts of the S1 and X2 handovers that could be supported/not supported. For example S1 handover without SGW relocation is a simpler procedure than full S1 handover as specified in the standard.

Another example of a functionality that could be indicated and that may be supported differently from the different network slices is related to an aspect of Control Plane (CP) and User Plane (UP) split. The first network slice may support or the first set of functionalities may comprise:

Both "CP/UP split" and "Combined CP/UP". This would be the normal current level of support once both options are standardized. The "CP/UP split" is at least partly supported already today over the S1-interface as control plane is based on the S1-MME interface between the eNB and the MME, and user plane is based on the S1-U interface between the eNB and the SGW. The "Combined CP/UP" means for example that both control and user plane are based on a single interface. One such example is to use the S1-MME for both user and control plane between the eNB and the MME. This may typically be used for wireless devices that transmit only a small amount of data, e.g. an electricity meter sending a small amount of data relatively seldom.

Only "CP/UP split". This would mean that the "Combined CP/UP" would not need to be supported on the core network side.

Only "Combined CP/UP". This would mean that the "CP/UP split" would not need to be supported on the core network side. One additional example for this case is that the network slice or the radio network node 12 may not need to support any EPS bearers or procedures to create UE contexts in the RAN for the S1-U interface.

Figure 10:
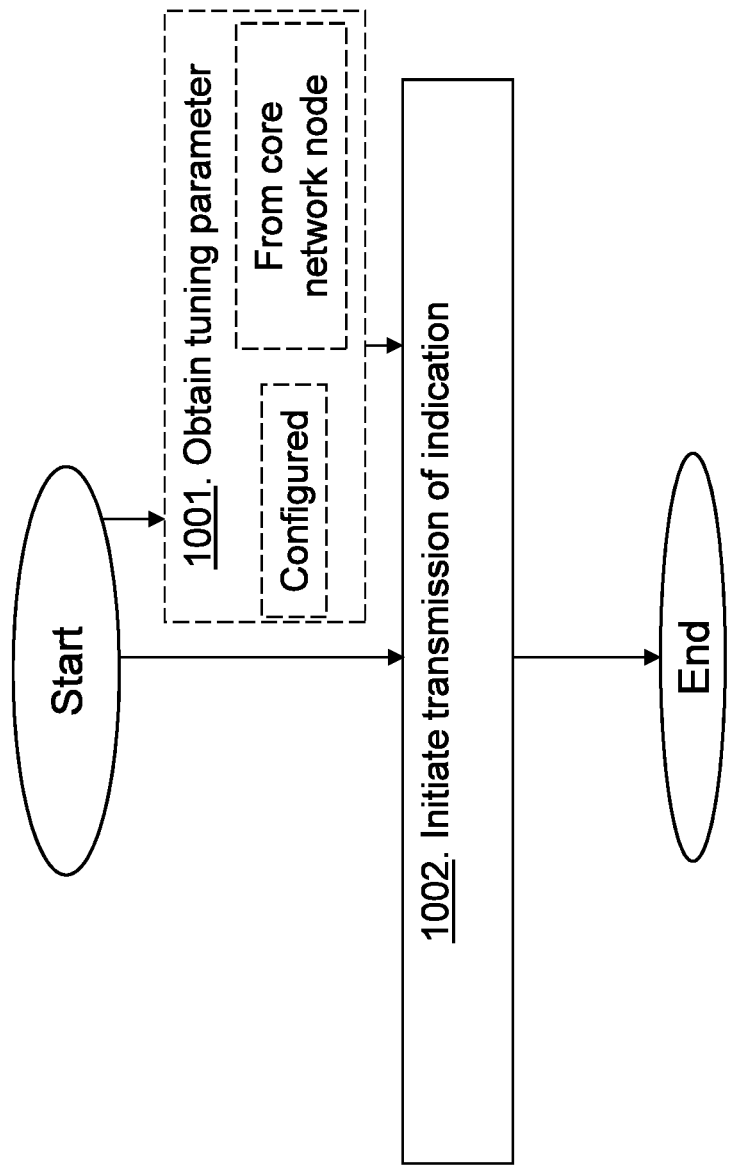
FIG. 10 is a schematic flowchart depicting a method performed by a network node according to embodiments herein.

The method actions performed by the network node, illustrated as the first network element 13 herein, for enabling communication between the wireless device 10 and the first network node 13 via a radio network node 12 in the communication network 1 according to embodiments herein will now be described with reference to a flowchart depicted in FIG. 10. The actions do not have to be taken in the order stated below, but may be taken in any suitable order. Actions performed in some embodiments are marked with dashed boxes. The first network node 13 supports the first set of functionalities out of the total set of functionalities in a core network of the communication network, which first set of functionalities belongs to a first network slice of the core network, and is separated from another set of functionalities out of the total set of functionalities in the core network. The first set of functionalities may be associated with a certain type of wireless devices, a certain enterprise, a certain operator or a certain agreement. The first network node 13 may be a Mobility Managing Entity, a Serving GPRS Support Node (SGSN), or a corresponding node in e.g. a 5G network). GPRS meaning General Packet Radio Services.

Action 1001. The first network node 13 may obtain a tuning parameter during configuration of the network node 13 or by receiving the tuning parameter from a core network node, e.g. a Home Subscriber Server (HSS). The tuning parameter may be an Allocation and Retention Priority, ARP, value. The first network node 13 may determine the tuning parameter based on configuration, e.g. as part of a roaming agreement, or it is received from the HSS as part of the subscriber data. This allows differentiating inbound roamers, i.e. wireless devices passing by, from own subscribers; and differentiating Inbound roamers from different operators, e.g. from within an operator group and from operators outside of this group. In this case the tuning parameter may be determined based on International Mobile Subscriber Identity (IMSI) range analysis, i.e., different tuning parameter values may be given for wireless devices from operator A and for operator B, the wireless devices from a certain operator can be identified by an (IMSI), because the IMSI contains Mobile Network Code (MNC) and Mobile Country Code (MCC).

Action 1002. The first network node 13 initiates a transmission of the indication, during the connection setup for the wireless device 10, to the radio network node 12, which indication indicates the supported first set of functionalities. The transmission may further comprise the obtained tuning parameter, e.g. the ARP value for prioritizing certain services. This tuning parameter may also be updated later; hence it may have only a temporary meaning or may not be used at all. The indication may be the network slice-ID identifying the first network slice. The network slice-ID may thus indicate the first set of functionalities. The transmission may be performed using a S1-AP.

As stated above the first set of functionalities may use one or more dedicated resources in a core network of the communication network, which one or more dedicated resources defines the first network slice of the core network, and which one or more dedicated resources are separated from other resources used by a different set of functionalities out of the total set of functionalities in the communication network. Separated may mean that the first set of functionalities uses one or more resources in the core network, and which one or more resources are separated, at least partly, from other resources used by the other set of functionalities. Hence, the network nodes may use a same hardware platform but are separated in e.g. memory storage processor usage or similar.

Figure 11:
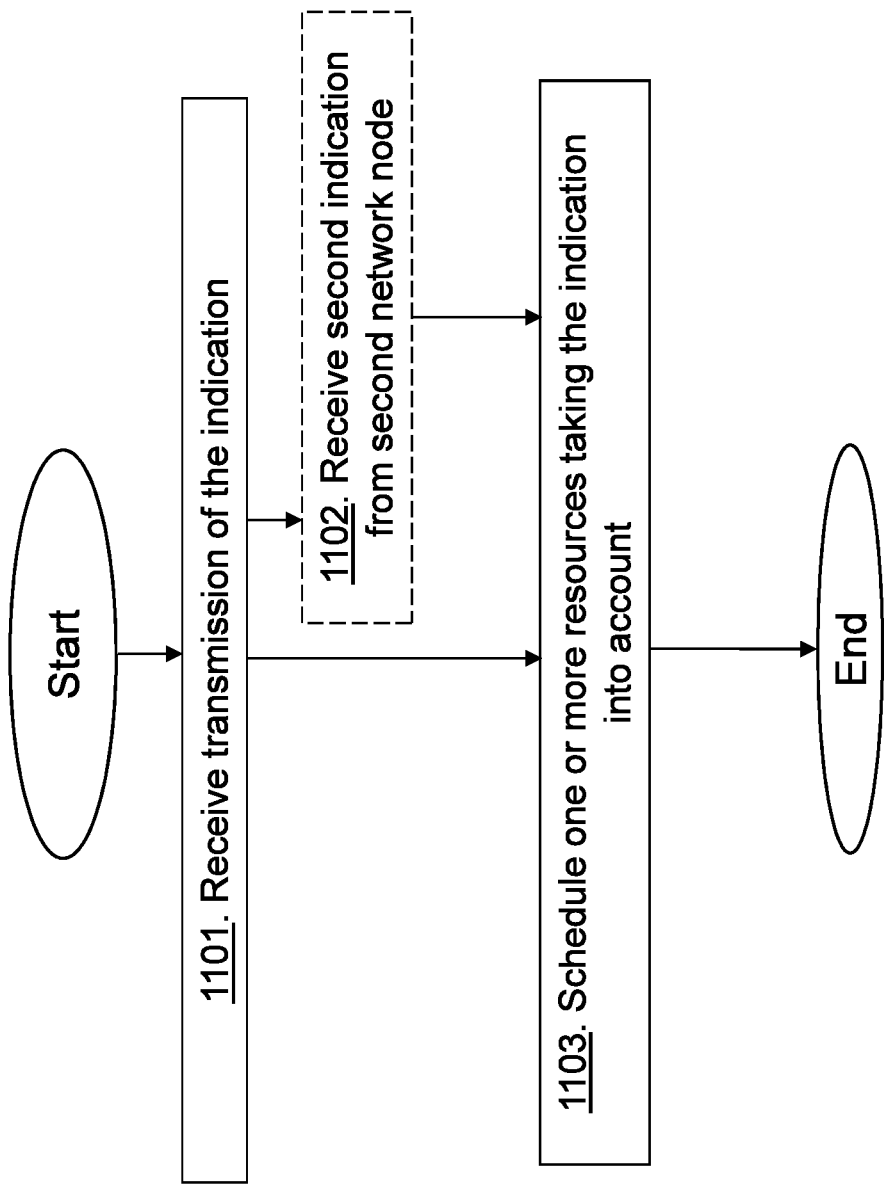
FIG. 11 is a schematic flowchart depicting a method performed by a radio network node according to embodiments herein.

The method actions performed by the radio network node 12 for enabling communication between the wireless device 10 and the first network node 13 comprised in the communication network according to embodiments herein will now be described with reference to a flowchart depicted in FIG. 11. The actions do not have to be taken in the order stated below, but may be taken in any suitable order. Actions performed in some embodiments are marked with dashed boxes. The first network node 13 supports the first set of functionalities out of the total set of functionalities in a core network of the communication network, which first set of functionalities belongs to a first network slice of the core network, and is separated from another set of functionalities out of the total set of functionalities in the core network. The first set of functionalities may be associated with a certain type of wireless devices, a certain enterprise, a certain operator or a certain agreement.

Action 1101. The radio network node 12 receives, from the first network node 13 during the connection setup for the wireless device 10, the transmission of the indication. The indication indicates the supported first set of functionalities. The transmission may further comprise the tuning parameter.

Action 1102. The radio network node 12 may further receive from the second network node 14 a second indication. The second network node 14 supports a second set of functionalities out of the total set of functionalities in the core network of the communication network. The second set of functionalities belongs to the second network slice of the core network, and is separated from the first set of functionalities out of the total set of functionalities in the core network. The second indication indicates a second set of functionalities supported by the second network slice.

Action 1103. The radio network node 12 schedules one or more resources for communicating with the wireless device 10 taking into account the indication. In addition, the radio network node 12 may take the tuning parameter into account when providing priority to the scheduling of the one or more resources. In addition, the radio network node 12 may take quality class identifier of a bearer supporting communication from the network node 13 to the wireless device 10 into account. When the radio network node 12 receives the second indication, the radio network node 12 may schedule the one or more resources taking the first indication and the second indication into account. An association between the wireless device 10 and the received indication may be stored at the radio network node 12.

Figure 12:
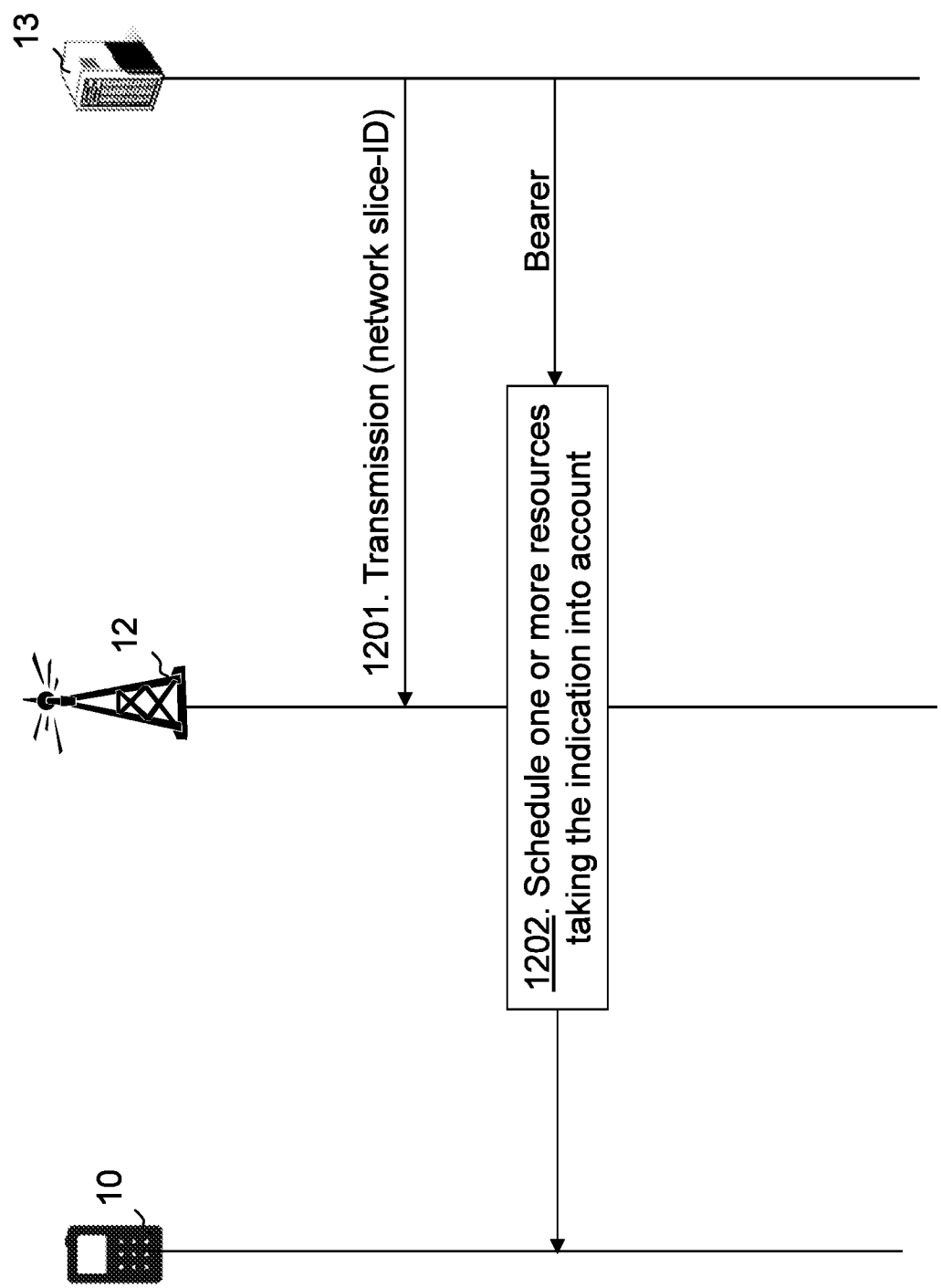
FIG. 12 is a combined flowchart and signalling scheme according to embodiments herein.

FIG. 12 is a combined flowchart and signaling scheme according to embodiments herein.

Action 1201. The first network node 13 initiates the transmission of the indication, during the connection setup for the wireless device 10, to the radio network node 12. The indication indicates the supported first set of functionalities. The transmission may further comprise the tuning parameter.

Action 1202. The radio network node 12 receives the transmission of the indication and schedules the one or more resources for communicating with the wireless device 10 taking into account the indication. E.g. if the radio network node receives data for different wireless devices over bearers with a same CQI value but from different network slices supporting different e.g. types of wireless devices. The radio network node 13 may prioritize traffic over a bearer of e.g. MBB devices over traffic over a bearer of e.g. MTC devices.

Figure 13:
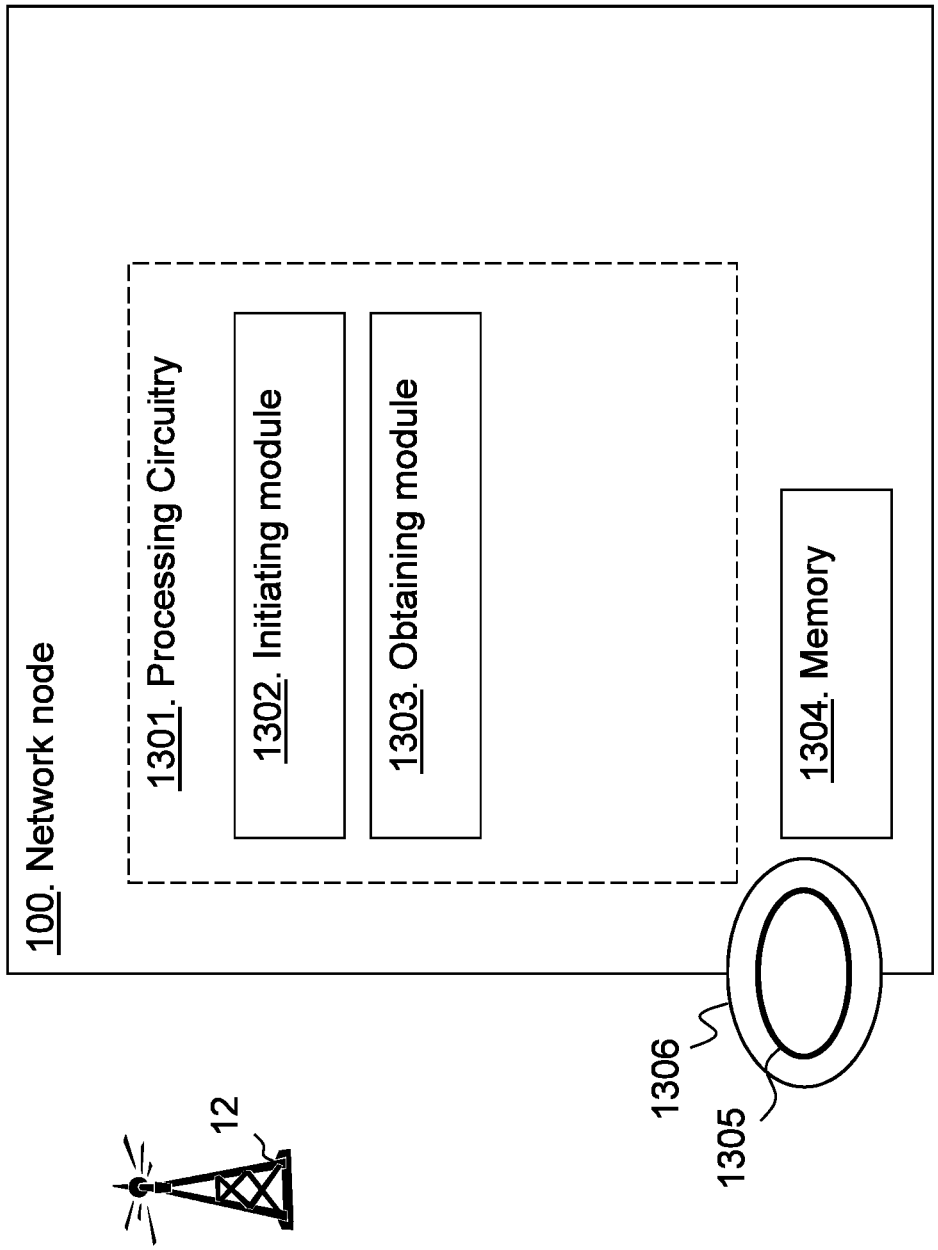
FIG. 13 is a block diagram depicting a network node according to embodiments herein.

FIG. 13 is a block diagram depicting a network node 100 exemplified above as the first network node 13 for enabling communication between the network node 100 and the wireless device 10 via the radio network node 12 in the communication network 1. The network node 100 is configured to support the first set of functionalities out of the total set of functionalities in the core network of the communication network. The first set of functionalities belongs to the first network slice of the core network, and is separated from another set of functionalities out of the total set of functionalities in the core network.

The network node 100 is configured to initiate the transmission of the indication, during a connection setup for the wireless device 10, to the radio network node 12. The indication indicates the supported first set of functionalities. The transmission may further comprise the tuning parameter. The tuning parameter may be the ARP value. The indication may be the network slice-ID identifying the first network slice. The transmission may be performed using a S1-AP.

The network node 100 may further be configured to obtain the tuning parameter during configuration of the network node 100 or by being configured to receive the tuning parameter from the core network node.

The network node 100 may comprise processing circuitry 1301 configured to perform the methods herein.

The network node 100 may comprise an initiating module 1302. The processing circuitry 1301 and/or the initiating module 1302 may be configured to initiate the transmission of the indication, during a connection setup for the wireless device 10, to the radio network node 12. The indication indicates the supported first set of functionalities.

The network node 100 may comprise an obtaining module 1303. The processing circuitry 1301 and/or the obtaining module 1303 may be configured to obtain the tuning parameter during configuration of the network node 13 or by being configured to receive the tuning parameter from the core network node.

The network node 100 further comprises a memory 1304. The memory comprises one or more units to be used to store data on, such as network slice IDs, tuning parameters, indications, applications to perform the methods disclosed herein when being executed, and similar.

The methods according to the embodiments described herein for the network node 100 are respectively implemented by means of e.g. a computer program 1305 or a computer program product, comprising instructions, i.e., software code portions, which, when executed on at least one processor, cause the at least one processor to carry out the actions described herein, as performed by the network node 100. The computer program 1305 may be stored on a computer-readable storage medium 1306, e.g. a disc or similar. The computer-readable storage medium 1306, having stored thereon the computer program, may comprise the instructions which, when executed on at least one processor, cause the at least one processor to carry out the actions described herein, as performed by the network node 100. In some embodiments, the computer-readable storage medium may be a non-transitory computer-readable storage medium.

Figure 14:
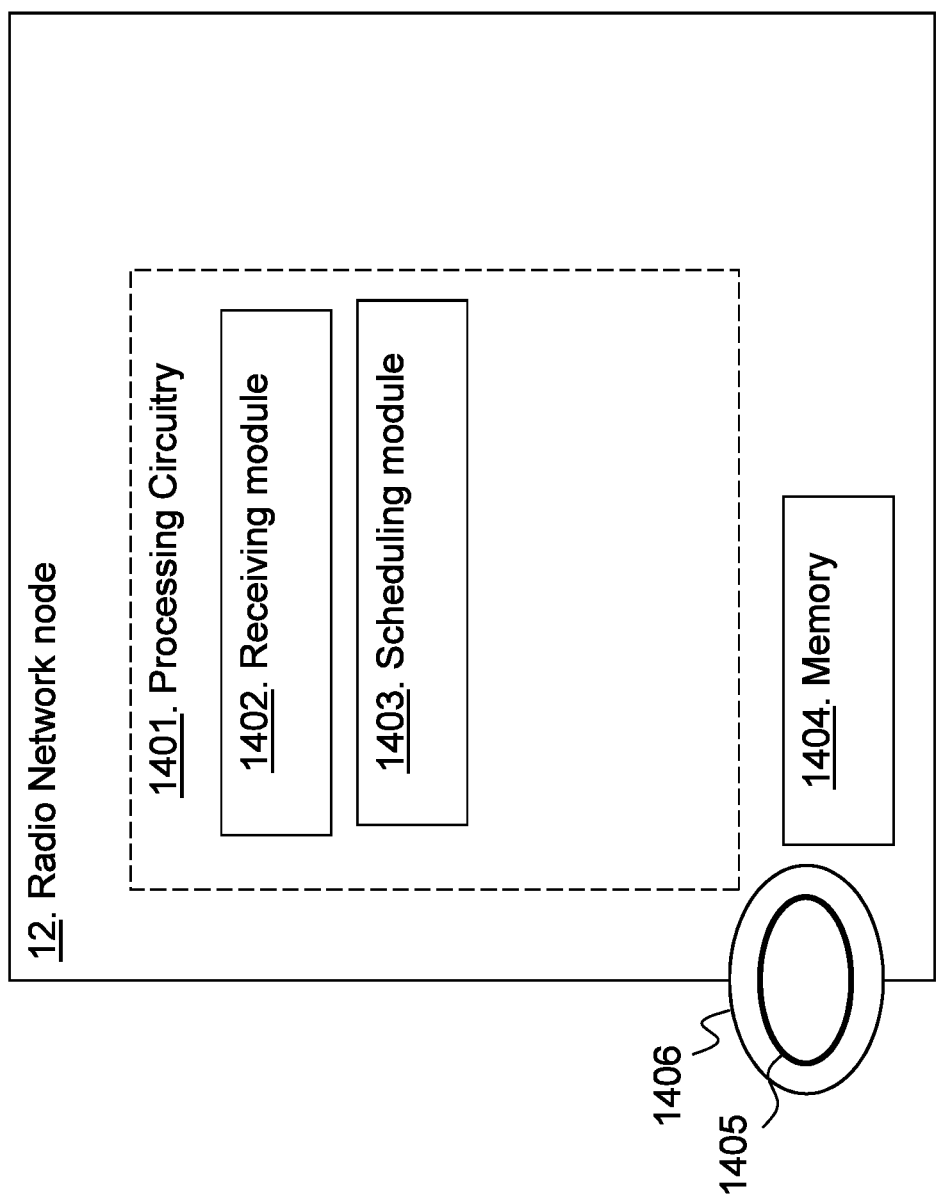
FIG. 14 is a block diagram depicting a radio network node according to embodiments herein.

FIG. 14 is a block diagram depicting the radio network node 12 for enabling communication between the wireless device 10 and the network node 13 comprised in the communication network 1.

The radio network node 12 is configured to receive from the network node during a connection setup for the wireless device 10, the transmission of the indication. The indication indicates the first set of functionalities supported, at the network node, out of the total set of functionalities in the core network of the communication network. The first set of functionalities belongs to the first network slice of the core network, and is separated from another set of functionalities out of the total set of functionalities in the core network. The transmission may further comprises the tuning parameter.

The radio network node 12 further configured to schedule the one or more resources for communicating with the wireless device 10 taking into account the indication. The radio network node 12 may be configured to take the tuning parameter into account when providing priority to the scheduling of the one or more resources. The radio network node 12 may be configured to schedule the one or more resources taking quality class identifier of the bearer supporting communication from the network node 100 to the wireless device 10 into account.

The radio network node 12 may further be configured to receive from the second network node 14 the second indication, which second network node 14 supports the second set of functionalities out of the total set of functionalities in the core network of the communication network. The second set of functionalities belongs to the second network slice of the core network, and is separated from the first set of functionalities in the core network. The second indication indicates the second set of functionalities supported by the second network node. The radio network node 12 may be configured to schedule the one or more resources taking the first and the second indication into account.

The radio network node 12 may comprise processing circuitry 1401 configured to perform the methods herein.

The radio network node 12 may comprise a receiving module 1402. The processing circuitry 1401 and/or the receiving module 1402 may be configured to receive from the network node during a connection setup for the wireless device 10, the transmission of the indication. The indication indicates the first set of functionalities supported, at the network node, out of the total set of functionalities in the core network of the communication network. The first set of functionalities belongs to the first network slice of the core network, and is separated from another set of functionalities out of the total set of functionalities in the core network. The transmission may further comprises the tuning parameter.

The radio network node 12 may comprise a scheduling module 1403. The processing circuitry 1401 and/or the scheduling module 1403 may be configured to schedule the one or more resources for communicating with the wireless device 10 taking into account the indication. The processing circuitry 1401 and/or the scheduling module 1403 may be configured to take the tuning parameter into account when providing priority to the scheduling of the one or more resources. The processing circuitry 1401 and/or the scheduling module 1403 may be configured to schedule the one or more resources taking quality class identifier of the bearer supporting communication from the network node 100 to the wireless device 10 into account.

The processing circuitry 1401 and/or the receiving module 1402 may further be configured to receive from the second network node 14 the second indication, which second network node 14 supports the second set of functionalities out of the total set of functionalities in the core network of the communication network. The second set of functionalities belongs to the second network slice of the core network, and is separated from the first set of functionalities in the core network. The second indication indicates the second set of functionalities supported by the second network node. The processing circuitry 1401 and/or the scheduling module 1403 may be configured to schedule the one or more resources taking the first and the second indication into account.

The radio network node 12 further comprises a memory 1404. The memory comprises one or more units to be used to store data on, such as network slice IDs, tuning parameters, indications, radio resources, applications to perform the methods disclosed herein when being executed, and similar.

The methods according to the embodiments described herein for the radio network node 12 are respectively implemented by means of e.g. a computer program 1405 or a computer program product, comprising instructions, i.e., software code portions, which, when executed on at least one processor, cause the at least one processor to carry out the actions described herein, as performed by the radio network node 12. The computer program 1405 may be stored on a computer-readable storage medium 1406, e.g. a disc or similar. The computer-readable storage medium 1406, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a network node for enabling communication between the network node and a wireless device via a radio network node in a communication network, wherein the network node supports a first set of functionalities out of a total set of functionalities in a core network of the communication network, and wherein the first set of functionalities belongs to a first network slice of the core network, and is separated from another set of functionalities out of the total set of functionalities in the core network, the method comprising:

obtaining a tuning parameter during configuration of the network node; and initiating a transmission of an indication, during a connection setup for the wireless device, to the radio network node, wherein:

the transmission comprises the tuning parameter, the tuning parameter is an Allocation and Retention Priority (ARP) value, the ARP value is determined based on International Mobile Subscriber Identity (IMSI) range analysis, the indication indicates the first set of functionalities supported by the network node, the first set of functionalities is associated with a type of wireless devices, and the first network slice of the core network supports a combination of a control plane and a user plane.

2. The method according to claim 1, wherein the indication is a network slice-ID identifying the first network slice.

3. The method according to claim 1, wherein the transmission is performed using an S1 Application Protocol (S1-AP).

4. A method performed by a radio network node for enabling communication between a wireless device and a network node comprised in a communication network, the method comprising:

receiving, from the network node during a connection setup for the wireless device, a transmission of an indication, wherein:

the transmission comprises a tuning parameter, the tuning parameter is an Allocation and Retention Priority (ARP) value, the ARP value is determined based on International Mobile Subscriber Identity (IMSI) range analysis, the tuning parameter is obtained, by the network node, during configuration of the network node, the indication indicates a first set of functionalities supported, at the network node, out of a total set of functionalities in a core network of the communication network, the first set of functionalities is associated with a type of wireless devices, the first set of functionalities belongs to a first network slice of the core network, and is separated from another set of functionalities out of the total set of functionalities in the core network, and the first network slice of the core network supports a combination of a control plane and a user plane; and scheduling one or more resources for communicating with the wireless device taking into account the indication.

5. The method according to claim 4, wherein the scheduling the one or more resources further takes the tuning parameter into account when providing priority to the scheduling of the one or more resources.

6. The method according to claim 4, wherein the scheduling the one or more resources further takes quality class identifier of a bearer supporting communication from the network node to the wireless device into account.

7. The method according to claim 4, wherein the indication is a first indication, and wherein the method further comprises:

receiving, from a second network node, a second indication, wherein:

the second network node supports a second set of functionalities out of the total set of functionalities in the core network of the communication network, the second set of functionalities belongs to a second network slice of the core network, and is separated from the first set of functionalities in the core network, and the second indication indicates the second set of functionalities supported by the second network node; and scheduling the one or more resources taking the first and the second indications into account.

8. A network node for enabling communication between the network node and a wireless device via a radio network node in a communication network, wherein the network node is configured to support a first set of functionalities out of a total set of functionalities in a core network of the communication network, and wherein the first set of functionalities belongs to a first network slice of the core network, and is separated from another set of functionalities out of the total set of functionalities in the core network, the network node comprising:

a processor; and memory containing instructions which, when executed by the processor, instruct the network node to perform operations to:

obtain a tuning parameter during configuration of the network node; and initiate a transmission of an indication, during a connection setup for the wireless device, to the radio network node, wherein:

the transmission comprises the tuning parameter, the tuning parameter is an Allocation and Retention Priority (ARP) value, the ARP value is determined based on International Mobile Subscriber Identity (IMSI) range analysis, the indication indicates the first set of functionalities supported by the network node, the first set of functionalities is associated with a type of wireless devices, and the first network slice of the core network supports a combination of a control plane and a user plane.

9. The network node according to claim 8, wherein the indication is a network slice-ID identifying the first network slice.

10. The network node according to claim 8, wherein the transmission is performed using an S1 Application Protocol (S1-AP).

11. A radio network node for enabling communication between a wireless device and a network node comprised in a communication network, the radio network node comprising:
a processor; and
memory containing instructions which, when executed by the processor, instruct the radio network node to perform operations to:
receive, from the network node during a connection setup for the wireless device, a transmission of an indication, wherein:
the transmission comprises a tuning parameter,
the tuning parameter is an Allocation and Retention Priority (ARP) value,
the ARP value is determined based on International Mobile Subscriber Identity (IMSI) range analysis,
the tuning parameter is obtained, by the network node, during configuration of the network node,
the indication indicates a first set of functionalities supported, at the network node, out of a total set of functionalities in a core network of the communication network,
the first set of functionalities is associated with a type of wireless devices,
the first set of functionalities belongs to a first network slice of the core network, and is separated from another set of functionalities out of the total set of functionalities in the core network, and
the first network slice of the core network supports a combination of a control plane and a user plane; and
schedule one or more resources for communicating with the wireless device taking into account the indication.

12. The radio network node according to claim 11, wherein the instructions instruct the radio network node to perform operations to schedule the one or more resources further taking the tuning parameter into account when providing priority to the scheduling of the one or more resources.

13. The radio network node according to claim 11, wherein the instructions instruct the radio network node to perform operations to schedule the one or more resources further taking quality class identifier of a bearer supporting communication from the network node to the wireless device into account.

14. The radio network node according to claim 11, wherein the indication is a first indication, and wherein the instructions further instruct the radio network node to perform operations to:
receive, from a second network node, a second indication, wherein:
the second network node supports a second set of functionalities out of the total set of functionalities in the core network of the communication network,
the second set of functionalities belongs to a second network slice of the core network, and is separated from the first set of functionalities in the core network, and
the second indication indicates the second set of functionalities supported by the second network node; and
schedule the one or more resources taking the first and the second indications into account.

15. A non-transitory computer-readable storage medium, having stored thereon a computer program comprising instructions which, when executed on at least one processor, cause a network node, for enabling communication between the network node and a wireless device via a radio network node in a communication network, wherein the network node supports a first set of functionalities out of a total set of functionalities in a core network of the communication network, and wherein the first set of functionalities belongs to a first network slice of the core network and is separated from another set of functionalities out of the total set of functionalities in the core network, to perform operations comprising:
obtaining a tuning parameter during configuration of the network node; and
initiating a transmission of an indication, during a connection setup for the wireless device, to the radio network node, wherein:
the transmission comprises the tuning parameter,
the tuning parameter is an Allocation and Retention Priority (ARP) value,
the ARP value is determined based on International Mobile Subscriber Identity (IMSI) range analysis,
the indication indicates the first set of functionalities supported by the network node,
the first set of functionalities is associated with a type of wireless devices, and
the first network slice of the core network supports a combination of a control plane and a user plane.

16. A non-transitory computer-readable storage medium, having stored thereon a computer program comprising instructions which, when executed on at least one processor, cause a radio network node, for enabling communication between a wireless device and a network node comprised in a communication network, to perform operations comprising:
receiving, from the network node during a connection setup for the wireless device, a transmission of an indication, wherein:
the transmission comprises a tuning parameter,
the tuning parameter is an Allocation and Retention Priority (ARP) value,
the ARP value is determined based on International Mobile Subscriber Identity (IMSI) range analysis,
the tuning parameter is obtained, by the network node, during configuration of the network node,
the indication indicates a first set of functionalities supported, at the network node, out of a total set of functionalities in a core network of the communication network,
the first set of functionalities is associated with a type of wireless devices,
the first set of functionalities belongs to a first network slice of the core network, and is separated from another set of functionalities out of the total set of functionalities in the core network, and
the first network slice of the core network supports a combination of a control plane and a user plane; and
scheduling one or more resources for communicating with the wireless device taking into account the indication.

* * * * *